(12) United States Patent
Kinoshita

(10) Patent No.: US 12,407,921 B2
(45) Date of Patent: Sep. 2, 2025

(54) INDUSTRIAL CAMERA AND INDUSTRIAL CAMERA SYSTEM

(71) Applicant: Keyence Corporation, Osaka (JP)

(72) Inventor: Akira Kinoshita, Osaka (JP)

(73) Assignee: KEYENCE CORPORATION, Osaka (JP)

( * ) Notice: Subject to any disclaimer, the term of this patent is extended or adjusted under 35 U.S.C. 154(b) by 99 days.

(21) Appl. No.: 18/589,493

(22) Filed: Feb. 28, 2024

(65) Prior Publication Data

US 2024/0334046 A1    Oct. 3, 2024

(30) Foreign Application Priority Data

Mar. 31, 2023    (JP) ................................ 2023-058184

(51) Int. Cl.
*H04N 23/65*    (2023.01)
*G06F 8/65*    (2018.01)
*H04N 23/56*    (2023.01)

(52) U.S. Cl.
CPC .............. *H04N 23/65* (2023.01); *G06F 8/65* (2013.01); *H04N 23/56* (2023.01)

(58) Field of Classification Search
CPC ........ H04N 23/65; H04N 23/56; H04N 23/74; H04N 23/50; G06F 8/65; H04L 12/10
See application file for complete search history.

(56) References Cited

U.S. PATENT DOCUMENTS

| | | | | |
|---|---|---|---|---|
| 2008/0290729 A1* | 11/2008 | Schoenberg | ............ | H04L 12/46 307/3 |
| 2009/0091630 A1* | 4/2009 | Bollhorst | ............... | H04N 23/60 348/207.11 |
| 2012/0271477 A1* | 10/2012 | Okubo | ................... | H04L 12/10 700/297 |
| 2016/0072990 A1* | 3/2016 | Dinev | ................... | H04N 23/56 348/207.11 |
| 2016/0072991 A1* | 3/2016 | Dinev | ................... | G06F 1/266 348/370 |
| 2016/0352389 A1* | 12/2016 | Chong | .................. | G08B 25/06 |
| 2021/0218332 A1* | 7/2021 | Sakamoto | ............. | H02J 7/0068 |

FOREIGN PATENT DOCUMENTS

JP    2022164148 A    10/2022

OTHER PUBLICATIONS

U.S. Appl. No. 18/589,497 (3110-415) filed Feb. 28, 2024 (51 pages).

* cited by examiner

*Primary Examiner* — Timothy J Henn
(74) *Attorney, Agent, or Firm* — Kilyk & Bowersox, P.L.L.C.

(57) ABSTRACT

An industrial camera 2 includes an interface unit 27 capable of supplying power to an external illuminator, a PoE power supply input unit 24 to which a PoE voltage is input from a PoE power supply 6B, a step-down circuit 25 that steps down the PoE voltage input to the PoE power supply input unit 24, a power supply selector 26 for supplying one of a voltage generated by the step-down circuit 25 and the PoE voltage to the external illuminator, and a processor 22 that transmits a light emission instruction to the external illuminator. The processor 22 controls the power supply selector 26 to supply the PoE voltage to the external illuminator when the external illuminator is identified as PoE compatible, and to supply the voltage generated by the step-down circuit 25 to the external illuminator when the external illuminator is identified as PoE incompatible.

11 Claims, 5 Drawing Sheets

INDUSTRIAL CAMERA AND INDUSTRIAL CAMERA SYSTEM

CROSS-REFERENCE TO RELATED APPLICATIONS

The present application claims foreign priority based on Japanese Patent Application No. 2023-058184, filed Mar. 31, 2023, the contents of which are incorporated herein by reference.

BACKGROUND OF THE INVENTION

Field of the Invention

The present disclosure relates to an industrial camera for image inspection and an industrial camera system.

Description of Related Art

For example, as disclosed in JP2022-164148A, in image inspection, a workpiece is imaged to acquire a workpiece image, the acquired workpiece image is used to determine the quality of the workpiece, and a determination result is presented to a user.

In order to generate workpiece images suitable for various inspections in the image inspection, adjustment of illumination conditions is important. In JP2022-164148A, various illumination conditions are realized by dedicated external illuminators.

SUMMARY OF THE INVENTION

The Power over Ethernet (POE) capable of performing communication and power supply with one cable is becoming widespread, and by using the PoE, power can be supplied to an industrial camera located at a position away from an AC power supply via an Ethernet cable. For example, it is conceivable to use the PoE when connecting an external illuminator to an industrial camera disclosed in JP2022-164148A. A PoE voltage supplied from a PoE power supply may be 57 V, for example.

On the other hand, a general-purpose illuminator operates by being supplied with power from a switching power supply, and a voltage supplied from the switching power supply is 24 V, which is lower than the PoE voltage. The general-purpose illuminator is incompatible with the PoE voltage supplied from the PoE power supply. Therefore, when the PoE voltage is supplied to a PoE-incompatible illuminator from an industrial camera compatible with the PoE power supply via an interface connectable to the general-purpose illuminator, the PoE-incompatible illuminator may fail.

Therefore, there is a problem that the industrial camera compatible with the PoE power supply cannot support various inspection applications using a general-purpose illuminator.

The present disclosure has been made in view of the above problem, and an object of the present disclosure is to enable PoE power supply and realize a desired inspection without causing a failure even with a PoE-incompatible illuminator.

In order to achieve the above object, in one aspect of the present disclosure, an industrial camera for image inspection can be assumed. An industrial camera includes: an imaging unit configured to generate a workpiece image obtained by imaging a workpiece; an interface unit configured to be connected to an external illuminator used during imaging by the imaging unit and to supply power to the external illuminator; a PoE power supply input unit to which a PoE voltage supplied from a PoE power supply having a higher voltage than a switching power supply is input; a first step-down circuit configured to step down the PoE voltage input to the PoE power supply input unit; a power supply selector configured to supply one of a voltage generated by the first step-down circuit and the PoE voltage to the external illuminator via the interface unit; and a first processor configured to control the imaging unit while transmitting a light emission instruction to the external illuminator. The first processor may identify whether the external illuminator is PoE compatible or PoE incompatible, and control the power supply selector to supply the PoE voltage to the external illuminator when the external illuminator is identified as PoE compatible, and to supply the voltage generated by the first step-down circuit to the external illuminator when the external illuminator is identified as PoE incompatible.

According to the configuration, when the PoE-compatible external illuminator is connected to the interface unit, the PoE voltage supplied from the PoE power supply having a higher voltage than the switching power supply is supplied to the external illuminator via the power supply selector. On the other hand, when the PoE-incompatible external illuminator is connected to the interface unit, the voltage stepped down by the first step-down circuit is supplied to the external illuminator via the power supply selector, and thus it is possible to enable PoE power supply without causing a failure even with the PoE-incompatible external illuminator.

The power supply selector may supply the voltage generated by the first step-down circuit to the external illuminator to activate the external illuminator. The first processor may transmit, to the activated external illuminator, a first signal for identifying whether the external illuminator is PoE compatible or PoE incompatible via the interface unit. That is, by supplying the voltage generated by the first step-down circuit to the external illuminator, the external illuminator can be safely activated so that both PoE-compatible and PoE-incompatible external illuminators can receive power without failure. By transmitting the first signal after activating the external illuminator, the external illuminator can reliably receive the first signal.

The industrial camera may further include a storage unit configured to store type information including whether a type of the external illuminator is PoE compatible or PoE incompatible. The first processor may be communicably connected to a second processor included in the external illuminator via the interface unit, recognize the type of the external illuminator based on a second signal returned from the second processor via the interface unit in response to the first signal, and determine whether the external illuminator is PoE compatible or PoE incompatible based on the recognized type and the type information. Accordingly, since it is reliably understood that the external illuminator is PoE compatible based on the type information, safe power supply based on the PoE voltage becomes possible.

The industrial camera may further include a normal power supply input unit to which a normal voltage from the switching power supply is input, and a setting unit configured to set an illumination volume of the external illuminator. When the type information stored in the storage unit includes a PoE power range that is settable when power is supplied by the PoE voltage for each type of the external illuminator, the first processor identifies which of the PoE voltage and the normal voltage is received. When it is identified that the normal voltage is received, the first processor reflects the set illumination volume in the external illuminator, and when it is identified that the PoE voltage is received, the first processor may determine whether light emission based on the set illumination volume is possible depending on whether the set illumination volume is within the PoE power range of the external illuminator.

According to the configuration, since not only the PoE power supply but also the normal switching power supply are compatible, the industrial camera can be used in accordance with an environment of a user, and versatility is enhanced. Since the power that can be supplied by the PoE power supply is restricted as compared with the normal switching power supply, the light emission may be realized with a normal power supply but may not be realized by the PoE power supply depending on the set illumination volume. In the configuration, the normal switching power supply and the PoE power supply can be used in combination, and the industrial camera can determine whether the set illumination volume may be reflected as it is depending on which power supply is used.

When the set illumination volume is not within the PoE power range of the connected external illuminator, it is possible to output a signal for notifying a user of an error indicating that the light emission based on the set illumination volume is not possible. Further, when the set illumination volume is not within the PoE power range of the connected external illuminator, the illumination volume can be automatically adjusted to be within the PoE power range.

The external illuminator may include an illumination head and a conversion cable having a second processor configured to control light emission of the illumination head. In this case, the conversion cable may include a second step-down circuit configured to further step down a voltage supplied from the power supply selector, and the second processor may supply a voltage generated by the second step-down circuit to the illumination head connected to the conversion cable and control the illumination head based on a light emission instruction transmitted from the first processor. For example, even when there is no processor in the illumination head, the second processor of the conversion cable can control the illumination head, and thus the number of options for the illumination head can be increased.

The first processor may allow a predetermined current, as the first signal, to flow through the activated external illuminator via the interface unit, and identify whether the external illuminator is PoE compatible or PoE incompatible based on current-voltage characteristics of the external illuminator obtained from the current. For example, it is conceivable that it is not possible to identify whether PoE compatible or PoE incompatible based on the type of the external illuminator or the like. However, even in such a case, it is possible to identify whether the external illuminator is PoE compatible or PoE incompatible based on the current-voltage characteristic of the external illuminator.

An upper limit value of the illumination volume may be set to a first value smaller than a maximum value settable within the PoE power range. For example, a settable upper limit of the illumination volume can be intentionally lowered to cope with heat generation of the external illuminator.

The industrial camera may receive an update of software executable by the first processor. By the update of the software, the upper limit value of the illumination volume can be set to a second value that is equal to or smaller than the maximum value within the POE power range and is larger than the first value. For example, when heat generation of hardware of the external illuminator is reduced, for example, due to a change in use environment or by providing a cooling fan for the external illuminator, an image for inspection using an illuminator with higher luminance can be acquired by raising the set upper limit of the illumination volume, and thus a range of inspection can be expanded.

As described above, the PoE voltage can be supplied to the external illuminator when the external illuminator is identified as PoE compatible, and the voltage generated by the first step-down circuit can be supplied to the external illuminator when the external illuminator is identified as PoE incompatible. Therefore, it is possible to enable PoE power supply and realize a desired inspection without causing a failure even with a PoE-incompatible illuminator.

DETAILED DESCRIPTION

Hereinafter, an embodiment of the present invention will be described in detail with reference to the drawings. The following description of a preferred embodiment is essentially nothing more than an illustration, and is not to limit the present invention, an application thereof, or a usage thereof.

Figure 1:
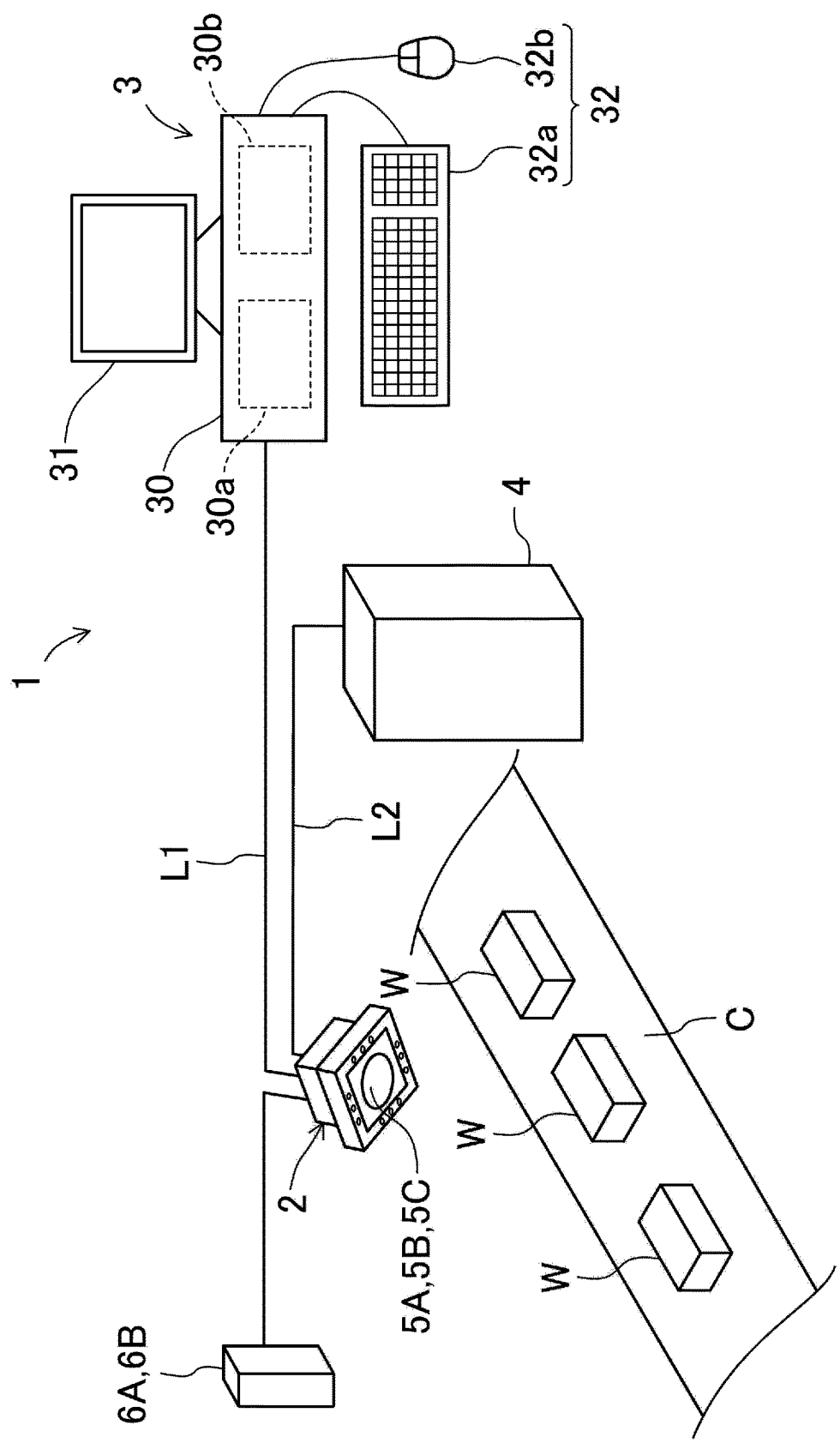
FIG. 1 is an overall view illustrating a use state of an image inspection device including an industrial camera according to an embodiment of the present invention.

FIG. 1 shows a configuration of an image processing apparatus 1 according to an embodiment of the present invention. FIG. 1 illustrates the image processing apparatus 1 during operation. The image processing apparatus 1 includes an industrial camera 2 that generates a workpiece image obtained by imaging a workpiece W, an image processing controller 3 that performs inspection or the like based on the workpiece image generated by the industrial camera 2, external illuminators 5A, 5B, and 5C (shown in FIG. 2), and power supplies 6A and 6B for supplying power to the industrial camera 2 and the external illuminators 5A, 5B, and 5C. The image processing apparatus 1 may further include an external device 4 such as a programmable logic controller (PLC). The external device 4 may or may not be a component of the image processing apparatus 1.

The image processing apparatus 1 is used at a site where a plurality of workpieces W are conveyed sequentially. At such a site, the workpiece W is conveyed at a predetermined speed by a conveying device such as a belt conveyor C. The industrial camera 2 is controlled by, for example, the external device 4 or the image processing controller 3 to image the workpiece W conveyed by the belt conveyor C when the workpiece W enters a visual field range of the industrial camera 2. When the industrial camera 2 images the workpiece W, an illuminator 5 is controlled to irradiate the workpiece W with light. By repeating this operation, the industrial camera 2 sequentially images a plurality of workpieces W conveyed by the belt conveyor C.

Although not illustrated, the industrial camera 2 can also image the stopped workpiece W. Further, the industrial camera 2 can be operated in a state of being attached to, for example, a robot arm, and an operation form of the image processing apparatus 1 is not particularly limited.

The image processing controller 3 performs various settings of the industrial camera 2 and the external illuminators 5A, 5B, and 5C, and may include, for example, a desktop personal computer, a notebook personal computer, or the like, or may include an arithmetic processing device dedicated to image inspection, and the form thereof is not particularly limited. The image processing controller 3 includes a body unit 30, a monitor (display unit) 31, and an operation unit 32. The body unit 30 is communicably connected to the industrial camera 2 via a communication line L1. When the external device 4 is included, the industrial camera 2 is communicably connected to the external device 4 via another communication line L2. The industrial camera 2 and at least one of the external illuminators 5A, 5B, and 5C constitute an industrial camera system.

The body unit 30 is provided with a control unit 30a including a central processing unit, a ROM, a RAM, and the like. The body unit 30 is also provided with a storage unit 30b including a hard disk drive, a solid-state drive, and the like. The storage unit 30b stores a program for operating the control unit 30a, setting information on the industrial camera 2, various images, and the like. A part of the storage unit 30b may be provided in the industrial camera 2. In this case, the industrial camera 2 can hold the setting information on the industrial camera 2, various images, and the like.

The operation unit 32 includes, for example, a keyboard 32a and a mouse 32b. The keyboard 32a and the mouse 32b are examples of members for operating the image processing controller 3, and operation states of the keyboard 32a and the mouse 32b are detected by the control unit 30a. The operation unit 32 is not limited to the keyboard 32a and the mouse 32b, and may be a so-called touch panel type operation unit. A monitor 31 includes a liquid crystal display device and the like, and is controlled by the control unit 30a to display various user interface screens, various images, and the like for setting the industrial camera 2. A touch panel type operation unit may be incorporated into the monitor 31.

Figure 2:
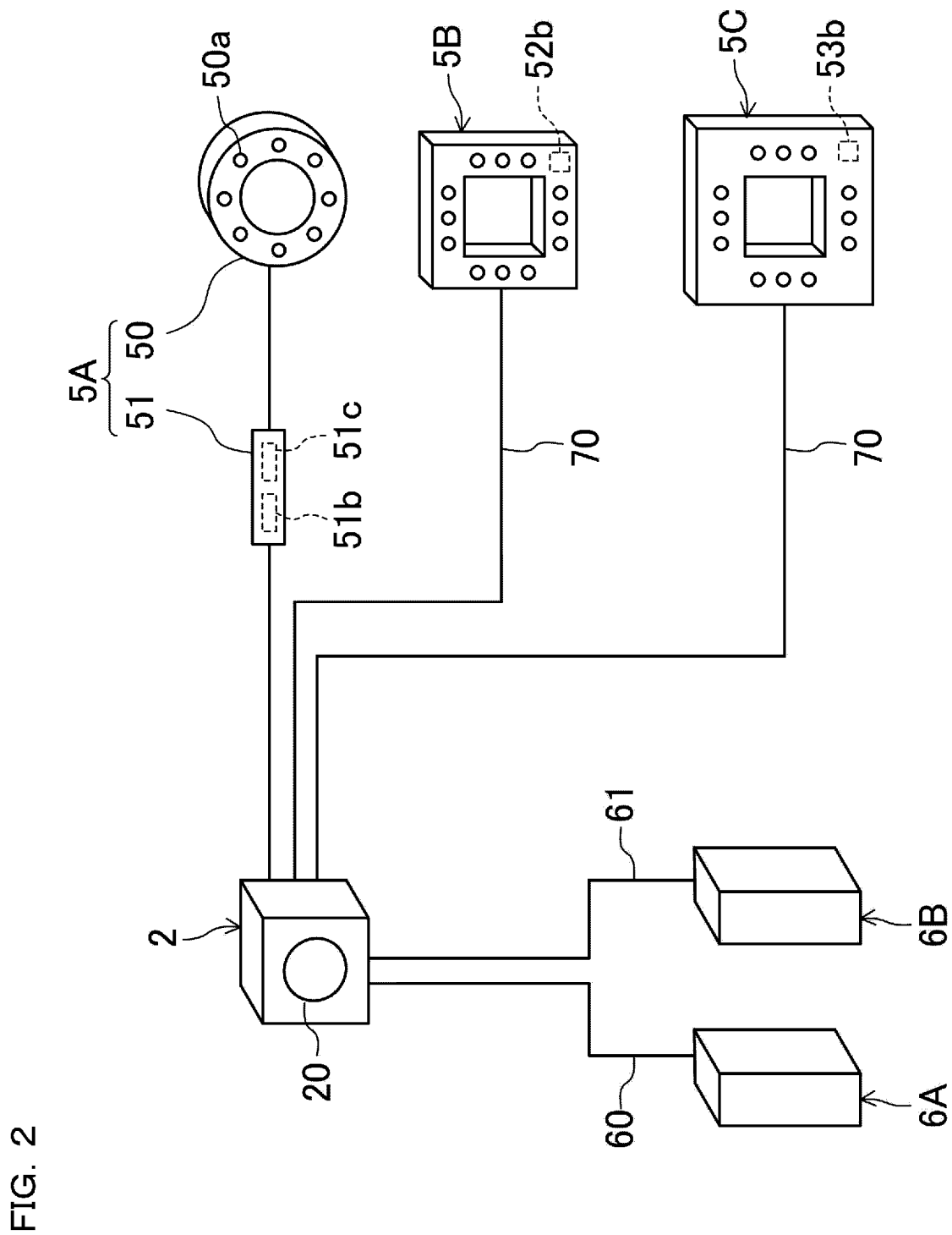
FIG. 2 schematically shows a case where various external illuminators and power supplies are connected to the industrial camera.

The industrial camera 2 is a member for generating a workpiece image to be inspected by the image processing controller 3, and thus is an industrial camera for image inspection. FIG. 2 collectively shows a plurality of forms in which the industrial camera 2 can be operated. One or both of the switching power supply 6A and a PoE power supply 6B can be connected to the industrial camera 2 as a power supply. The switching power supply 6A includes a power supply device including a switching regulator for converting a commercial power supply to a DC power supply, and is also referred to as a switching type DC stabilized power supply device. Since the switching power supply 6A is well known, a detailed description thereof will be omitted. A voltage supplied from the switching power supply 6A is, for example, 24 V, and the voltage supplied from the switching power supply 6A is referred to as a normal voltage in the specification. The switching power supply 6A and the industrial camera 2 are connected by a power supply cable 60, and power output from the switching power supply 6A is supplied to the industrial camera 2 via the power supply cable 60.

The PoE power supply 6B is a power supply device configured to supply power to the outside using the PoE power supply, that is, a local area network (LAN) cable 61. Since the POE power supply 6B is also well known, a detailed description thereof is omitted. A PoE power supply standard usable in the present embodiment is not particularly limited, and examples thereof include PoE (IEEE 802.3af), PoE+ (IEEE 802.3at), and PoE++ (IEEE 802.3bt). A voltage supplied from the PoE power supply 6B is set to a voltage (for example, 57 V) higher than the voltage supplied from the switching power supply 6A. The voltage supplied from the PoE power supply 6B is referred to as a PoE voltage in the specification. The PoE power supply 6B and the industrial camera 2 are connected by a LAN cable 61, and power output from the PoE power supply 6B is supplied to the industrial camera 2 via the LAN cable 61.

Any one external illuminator among a first external illuminator 5A, a second external illuminator 5B, and a third external illuminator 5C can be connected to the industrial camera 2 as the external illuminator. The external illuminator is an illuminator that is not built in a housing 20 of the industrial camera 2, and is an illuminator that is detachably attached to the housing 20 or an illuminator that is attached to a bracket (not shown) or the like different from the housing 20.

In FIG. 2, all of the first external illuminator 5A, the second external illuminator 5B, and the third external illuminator 5C are connected to the industrial camera 2, but in actual operation, only one external illuminator is connected to the industrial camera 2. Accordingly, at least one terminal to which the first external illuminator 5A, the second external illuminator 5B, and the third external illuminator 5C can be connected is provided in the industrial camera 2. Two or more external illuminators may be simultaneously connectable to the industrial camera 2.

Power is supplied from the industrial camera 2 to the first external illuminator 5A, the second external illuminator 5B, and the third external illuminator 5C. Accordingly, since the first external illuminator 5A, the second external illuminator 5B, and the third external illuminator 5C according to the present embodiment are operated in a state in which the power supply is not directly connected, a power supply cable for directly supplying power from the power supply to the first external illuminator 5A, the second external illuminator 5B, and the third external illuminator 5C is unnecessary. Therefore, the degree of freedom in installing the first external illuminator 5A, the second external illuminator 5B, and the third external illuminator 5C is improved.

Figure 3:
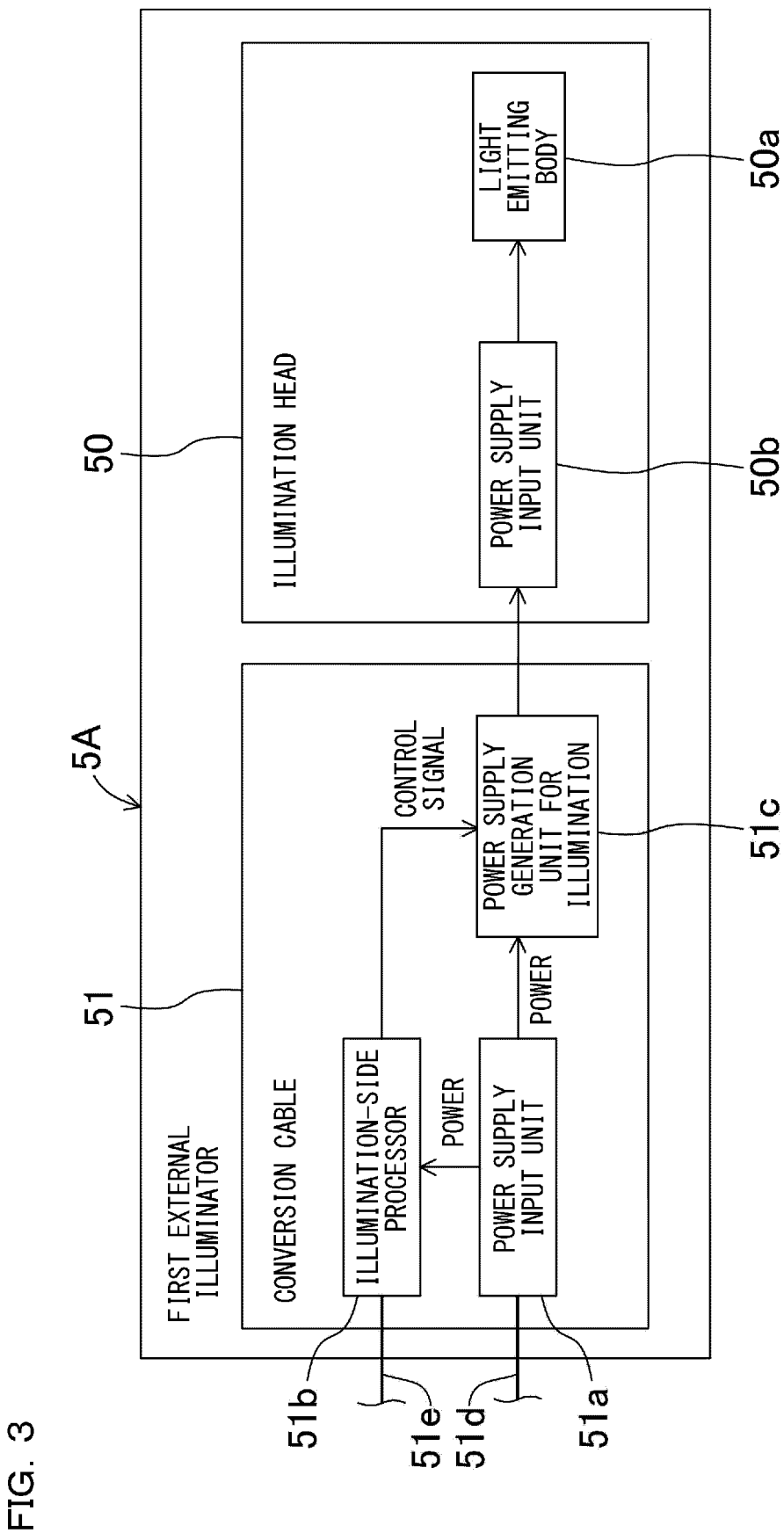
FIG. 3 is a block diagram of a first external illuminator.

As shown in FIG. 3, the first external illuminator 5A includes an illumination head 50 and a conversion cable 51. The conversion cable 51 is a member for connecting the illumination head 50 and the industrial camera 2, and supplies the power output from the industrial camera 2 to the illumination head 50. Specifically, the conversion cable 51 includes a power supply input unit 51a, an illumination-side processor 51b, and a power supply generation unit for illumination 51c. The power supply input unit 51a is a portion to which the power output from the industrial camera 2 is input. The power supply input unit 51a and the illumination-side processor 51b are connected, and the power input to the power supply input unit 51a is supplied to the illumination-side processor 51b and used as power for operating the illumination-side processor 51b. The illumination-side processor 51b is an example of a second processor.

The illumination-side processor 51b includes, for example, a microcomputer. The illumination-side processor 51b and the power supply generation unit for illumination 51c are connected, and the power supply generation unit for illumination 51c is controlled by the illumination-side processor 51b. The illumination-side processor 51b sends a control signal to the power supply generation unit for illumination 51c so as to supply predetermined power set in advance to the illumination head 50 based on a light emission instruction from the industrial camera 2 to be described later. The power supply input unit 51a is connected to the power supply generation unit for illumination 51c, and power input from the power supply input unit 51a is converted to predetermined power based on the control signal sent from the illumination-side processor 51b and then supplied to the illumination head 50. The power supply generation unit for illumination 51c is a second step-down circuit that further steps down a voltage supplied from a power supply selector 26 of the industrial camera 2 to be described later.

The illumination head 50 includes, for example, a light emitting body 50a including a light emitting diode and the like, and a power supply input unit 50b. The power supply input unit 50b is connected to the power supply generation unit for illumination 51c of the conversion cable 51. The power output from the power supply generation unit for illumination 51c is input to the power supply input unit 50b of the illumination head 50. The power supply input unit 50b and the light emitting body 50a are connected, and the light emitting body 50a emits light by supplying the power input to the power supply input unit 50b to the light emitting body 50a. The light emitting body 50a is controlled by the illumination-side processor 51b.

There are two types of the first external illuminators 5A: a PoE incompatible type that operates at a normal voltage but is incompatible with a PoE voltage; and a PoE compatible type that can operate at a PoE voltage. A PoE-incompatible first external illuminator 5A is configured to allow a normal voltage and not to allow a voltage higher than the normal voltage. Therefore, when the PoE voltage is supplied to the PoE-incompatible first external illuminator 5A, the PoE-incompatible first external illuminator 5A fails or does not operate.

A PoE-compatible first external illuminator 5A is configured to be operable by allowing the PoE voltage exceeding the normal voltage. Even if there is no processor in the illumination head 50 as in the first external illuminator 5A, by using the conversion cable 51, the first external illuminator 5A can be used like an external illuminator with a processor, like the second external illuminator 5B and the third external illuminator 5C, which will be described later.

Figure 4:
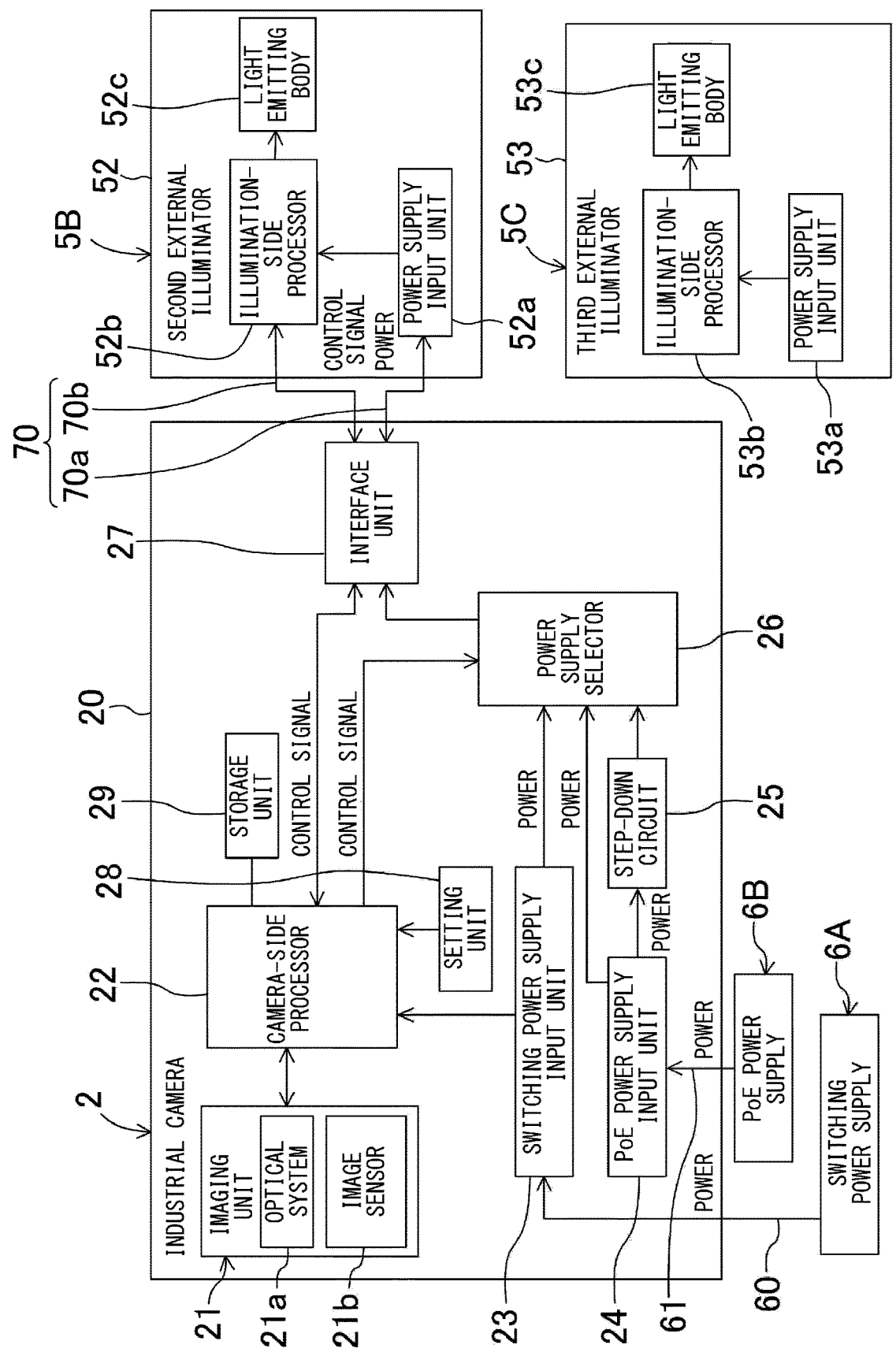
FIG. 4 is a block diagram of the industrial camera, a second external illuminator, and a third external illuminator.

The second external illuminator 5B is a PoE-incompatible external illuminator that operates at a normal voltage and is incompatible with the PoE voltage. As shown in FIG. 4, the second external illuminator 5B includes a power supply input unit 52a, an illumination-side processor 52b, and a light emitting body 52c, which are housed in a common housing 52. The power supply input unit 52a and the illumination-side processor 52b are connected, and the power input to the power supply input unit 52a is supplied to the illumination-side processor 52b and is used as power for operating the illumination-side processor 52b and power for lighting the light emitting body 52c.

The illumination-side processor 52b includes, for example, a microcomputer. The illumination-side processor 52b and the light emitting body 52c are connected, and the illumination-side processor 52b supplies predetermined power set in advance to the light emitting body 52c based on a light emission instruction from the industrial camera 2 to be described later. Accordingly, the light emitting body 52c emits light. The illumination-side processor 52b of the second external illuminator 5B is an example of the second processor.

The third external illuminator 5C is a PoE-compatible external illuminator that can operate at a PoE voltage. As shown in FIG. 4, the third external illuminator 5C and the second external illuminator 5B have the same configuration. That is, the third external illuminator 5C includes a power supply input unit 53a, an illumination-side processor 53b, and a light emitting body 53c, which are housed in a common housing 53. The power input to the power supply input unit 53a is supplied to the illumination-side processor 53b, and is used as power for operating the illumination-side processor 53b and power for lighting the light emitting body 53c. The illumination-side processor 53b and the light emitting body 53c are connected, and the illumination-side processor 53b supplies predetermined power set in advance to the light emitting body 53c based on a light emission instruction from the industrial camera 2 to be described later. Accordingly, the light emitting body 53c emits light. The illumination-side processor 53b of the third external illuminator 5C is an example of the second processor.

Next, the configuration of the industrial camera 2 will be described in detail. The industrial camera 2 includes an imaging unit 21, a camera-side processor 22, a switching power supply input unit 23, a PoE power supply input unit 24, a step-down circuit (first step-down circuit) 25, a power supply selector 26, and an interface unit 27. The imaging unit 21, the camera-side processor 22, the switching power supply input unit 23, the PoE power supply input unit 24, the step-down circuit 25, the power supply selector 26, and the interface unit 27 are accommodated in the housing 20.

The imaging unit 21 is a portion for generating a workpiece image obtained by imaging the workpiece W. The imaging unit 21 includes an optical system 21a in which light emitted from the external illuminators 5A, 5B, and 5C is reflected by a surface of the workpiece W and is incident, and an image sensor 21b that receives the light emitted from the optical system 21a, and the like. The image sensor 21b has a light-receiving surface constituted by a large number of light-receiving elements, like a COMS image sensor or a CCD image sensor and is controlled by the camera-side processor 22. The camera-side processor 22 is an example of the first processor.

In the image sensor 21b, an intensity of the light received by the light-receiving surface is converted into an amount of electric charge and converted into an electric signal to generate a workpiece image obtained by imaging the workpiece W. The generated workpiece image is output to the camera-side processor 22. The camera-side processor 22 outputs the workpiece image to the image processing controller 3. Accordingly, the workpiece image can be inspected by the image processing controller 3.

The camera-side processor 22 is configured with, for example, a processor such as a CPU or an ASIC, and hardware such as a RAM or a ROM, and can execute various processes by the hardware executing a predetermined program. The camera-side processor 22 is a portion that transmits a light emission instruction to an external illuminator currently connected to the industrial camera 2 among the external illuminators 5A, 5B, and 5C connectable to the industrial camera 2 and controls the imaging unit 21. For example, when a trigger is input from the external device 4 or the like, the camera-side processor 22 transmits a light emission instruction to the external illuminator connected to the industrial camera 2, and thus the external illuminator emits light to irradiate the workpiece W with light. Further, when a trigger is input from the external device 4 or the like, the camera-side processor 22 causes the image sensor 21b to perform imaging.

The switching power supply input unit 23 is a portion to which a normal voltage from the switching power supply 6A is input. The power supply cable 60 extending from the switching power supply 6A is connected to the switching power supply input unit 23, and power output from the switching power supply 6A is first input to the switching power supply input unit 23.

The PoE power supply input unit 24 is a portion to which a PoE voltage supplied from the PoE power supply 6B, which has a higher voltage than the switching power supply 6A, is input. The LAN cable 61 extending from the PoE power supply 6B is connected to the POE power supply input unit 24, and power output from the PoE power supply 6B is first input to the PoE power supply input unit 24. The power input from the switching power supply 6A or the PoE power supply 6B is also used to operate each unit of the industrial camera 2.

The step-down circuit 25 is connected to the PoE power supply input unit 24. The PoE voltage input to the PoE power supply input unit 24 is input to the step-down circuit 25. The step-down circuit 25 is a circuit configured to step down the PoE voltage input to the PoE power supply input unit 24. Specifically, the step-down circuit 25 includes an electric circuit that steps down the PoE voltage to the same voltage as the normal voltage from the switching power supply 6A.

As described above, among the first external illuminator 5A, the second external illuminator 5B, and the third external illuminator 5C used during imaging by the imaging unit 21, any one external illuminator can be connected to the interface unit 27, and the interface unit 27 can supply power and transmit a control signal to the connected external illuminator. For example, as shown in FIG. 2, when the first external illuminator 5A is connected to the industrial camera 2, the conversion cable 51 constituting a part of the first external illuminator 5A is connected to the interface unit 27. As shown in FIG. 3, the conversion cable 51 includes a power supply wiring 51d and a signal line 51e, and the conversion cable 51 is configured in a state in which the power supply wiring 51d and the signal line 51e are bundled. The power supply wiring 51d extends from the interface unit 27 to the power supply input unit 51a. The signal line 51e extends from the interface unit 27 to the illumination-side processor 51b. Accordingly, the camera-side processor 22 and the illumination-side processor 51b are communicably connected via the interface unit 27. When the control signal as the light emission instruction is sent from the camera-side processor 22 to the illumination-side processor 51b, the control signal can be received by the illumination-side processor 51b via the signal line 51e.

FIG. 4 shows a state in which the second external illuminator 5B is connected to the interface unit 27. In a case where the second external illuminator 5B is connected to the industrial camera 2, a connection cable 70 is used. The connection cable 70 includes a power supply wiring 70a and a signal line 70b, and the connection cable 70 is configured in a state in which the power supply wiring 70a and the signal line 70b are bundled. The power supply wiring 70a extends from the interface unit 27 to the power supply input unit 52a. The signal line 70b extends from the interface unit 27 to the illumination-side processor 52b. Accordingly, the camera-side processor 22 and the illumination-side processor 52b are communicably connected via the interface unit 27. For example, the control signal as the light emission instruction is sent from the camera-side processor 22 to the illumination-side processor 52b, and can be received by the illumination-side processor 52b.

The third external illuminator 5C is the same as the second external illuminator 5B, and the third external illuminator 5C can be connected to the interface unit 27 using the connection cable 70. In this case, the power supply wiring 70a extends from the interface unit 27 to the power supply input unit 53a. The signal line 70b extends from the interface unit 27 to the illumination-side processor 53b. Accordingly, the camera-side processor 22 and the illumination-side processor 53b are communicably connected via the interface unit 27. For example, the control signal as the light emission instruction is sent from the camera-side processor 22 to the illumination-side processor 53b, and can be received by the illumination-side processor 53b.

The camera-side processor 22, the switching power supply input unit 23, the PoE power supply input unit 24, and the step-down circuit 25 are connected to an input side of the power supply selector 26. The camera-side processor 22 sends a control signal to the power supply selector 26. The control on the power supply selector 26 performed by the camera-side processor 22 will be described later. The normal voltage from the switching power supply 6A is input from the switching power supply input unit 23 to the power supply selector 26. The PoE voltage supplied from the PoE power supply 6B is input from the PoE power supply input unit 24 to the power supply selector 26. A step-down voltage (normal voltage) is input from the step-down circuit 25 to the power supply selector 26.

An output side of the power supply selector 26 is connected to the interface unit 27. The power supply selector 26 supplies either the voltage generated by the step-down circuit 25 or the PoE voltage to the external illuminators 5A, 5B, and 5C via the interface unit 27. Specifically, first, the camera-side processor 22 identifies whether the external illuminators 5A, 5B, and 5C connected to the interface unit 27 are PoE compatible or PoE incompatible. Thereafter, when the camera-side processor 22 identifies that the external illuminators 5A, 5B, and 5C connected to the interface unit 27 are PoE compatible, the camera-side processor 22 supplies the PoE voltage to the external illuminators. When the camera-side processor 22 identifies that the external illuminators 5A, 5B, and 5C connected to the interface unit 27 are PoE incompatible, the camera-side processor 22 controls the power supply selector 26 to supply the voltage generated by the step-down circuit 25 to the external illuminators.

The industrial camera 2 includes a setting unit 28. The setting unit 28 is a portion that sets illumination volumes of the external illuminators 5A, 5B, and 5C. The illumination volume is the brightness of the external illuminators 5A, 5B, and 5C. Power consumption increases when the illumination volume is increased, and power consumption decreases when the illumination volume is decreased. The illumination volume can be set by the user via the image processing controller 3, and the setting by the user is set in the industrial camera 2 by the setting unit 28. An upper limit value of the illumination volume can be set to a first value smaller than a maximum value settable within the PoE power range. In this way, for example, a settable upper limit of the illumination volume can be intentionally lowered to cope with heat generation of the external illuminator.

The industrial camera 2 includes a storage unit 29 including, for example, a semi-conductor memory. The storage unit 29 stores type information including whether a type of the external illuminator is PoE compatible or PoE incompatible. That is, if the type of the external illuminator is specified, it is possible to identify whether the external illuminator is a PoE-compatible external illuminator or a PoE-incompatible external illuminator. PoE compatibility information indicating whether the external illuminator is PoE compatible or PoE incompatible is associated with the type stored in the storage unit 29, and the PoE compatibility information constitutes a part of the type information.

The storage unit 29 can additionally store other type information different from the type information already stored. For example, the image processing controller 3 can be connected to an external network to download the type information, and the type information downloaded to the image processing controller 3 can be additionally stored in the storage unit 29 of the industrial camera 2. Accordingly, when a new external illuminator different from the external illuminators that have been connected so far is connected, it is possible to identify whether the new external illuminator is the PoE-compatible external illuminator or the PoE-incompatible external illuminator. That is, the storage unit 29 can update the type information.

The additional storage can be performed by, for example, software update of the industrial camera 2. That is, the industrial camera 2 can receive an update of software executable by the camera-side processor 22. By the update of the software, it is possible not only to additionally store the type information but also to store information for setting the upper limit value of the illumination volume to a second value that is equal to or smaller than the maximum value within the PoE power range and is larger than the first value. For example, when heat generation of hardware of the external illuminator is reduced, for example, due to a change in use environment of the industrial camera 2 or by providing a cooling fan for the external illuminator, an image for inspection using an illuminator with higher luminance can be acquired by raising the set upper limit of the illumination volume, and thus a range of inspection can be expanded.

In addition, the type information stored in the storage unit 29 includes a PoE power range that is settable when power is supplied by the PoE voltage for each type of external illuminator. Accordingly, the PoE power range can also be acquired simply by specifying the type information.

Figure 5:
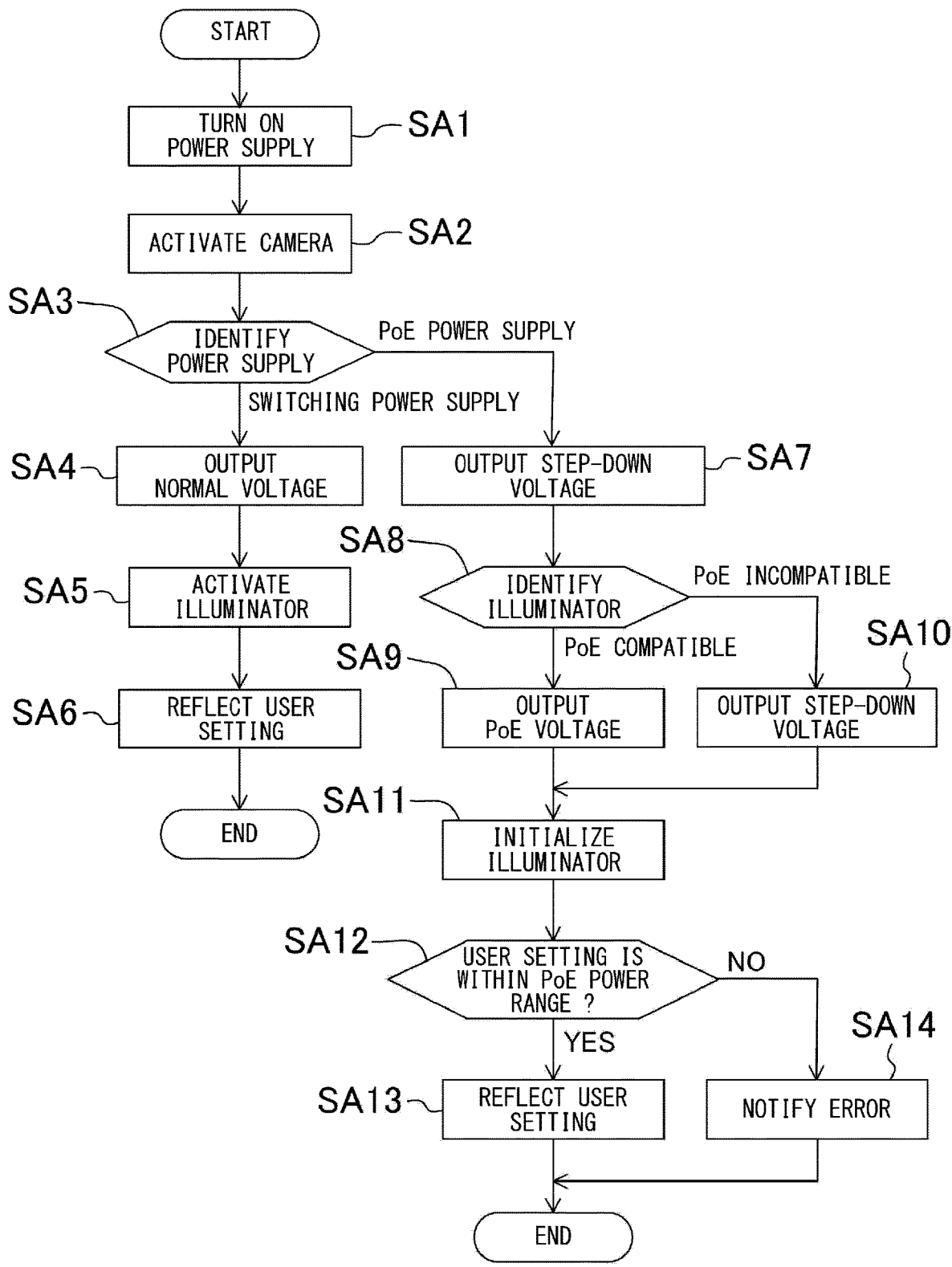
FIG. 5 is a flowchart illustrating an example of a procedure of power supply processing.

Hereinafter, power supply processing will be described in detail based on a flowchart shown in FIG. 5. The flowchart starts when any one of the first external illuminator 5A, the second external illuminator 5B, and the third external illuminator 5C is connected to the industrial camera 2 and one or both of the switching power supply 6A and the PoE power supply 6B are connected to the industrial camera 2.

In step SA1 after the start, a power supply connected to the industrial camera 2, that is, one or both of the switching power supply 6A and the PoE power supply 6B are turned on. In step SA2, the industrial camera 2 is activated.

Step SA3 is a step of identifying the power supply. That is, the camera-side processor 22 identifies whether the switching power supply 6A is connected to the switching power supply input unit 23 or whether the PoE power supply 6B is connected to the PoE power supply input unit 24. When the switching power supply 6A is connected to the switching power supply input unit 23, the processing proceeds to step SA4, and the camera-side processor 22 controls the power supply selector 26 so as to output the normal voltage from the interface unit 27. In step SA5, the external illuminator to which the normal voltage is supplied is activated. In step SA6, a user setting related to the illumination set by the setting unit 28 is reflected in the external illuminator.

When the PoE power supply 6B is connected to the PoE power supply input unit 24, the processing proceeds to step SA7. Step SA7 is a step of activating the connected external illuminators 5A, 5B, and 5C. At this time, it is unknown whether the connected external illuminators 5A, 5B, and 5C are PoE-compatible or PoE-incompatible. In step SA7, even if the PoE-incompatible external illuminator is connected, the voltage generated by the step-down circuit 25 (step-down voltage) is output so as not to cause a failure in the PoE-incompatible external illuminator. Specifically, the camera-side processor 22 controls the power supply selector 26, and under this control, the power supply selector 26 supplies the voltage generated by the step-down circuit 25 to the connected external illuminators 5A, 5B, and 5C to activate the connected external illuminators 5A, 5B, and 5C. Accordingly, the connected external illuminators 5A, 5B, and 5C are activated. Even if the PoE-incompatible external illuminator is connected, no failure occurs.

Thereafter, the processing proceeds to step SA8. Step SA8 is a step of identifying the connected external illuminator. In step SA8, first, the camera-side processor 22 transmits, to the activated external illuminator, a first signal for identifying whether the external illuminator is PoE compatible or PoE incompatible via the interface unit 27.

When the first external illuminator 5A is connected, the first signal is received by the illumination-side processor 51*b* built in the conversion cable 51 of the first external illuminator 5A via the interface unit 27. Upon receiving the first signal, the illumination-side processor 51*b* sends a second signal including information related to a type of the first external illuminator 5A. The second signal is returned from the illumination-side processor 51*b* to the camera-side processor 22 via the interface unit 27. The camera-side processor 22 recognizes the type of the first external illuminator 5A based on the second signal returned from the illumination-side processor 51*b* of the first external illuminator 5A and the type information stored in the storage unit 29. The camera-side processor 22 determines whether the first external illuminator 5A currently connected is PoE compatible or PoE incompatible based on the recognized type and the type information.

When the second external illuminator 5B is connected, the first signal is received by the illumination-side processor 52*b* of the second external illuminator 5B via the interface unit 27. Upon receiving the first signal, the illumination-side processor 52*b* sends a second signal including information related to a type of the second external illuminator 5B. The second signal is returned from the illumination-side processor 52*b* to the camera-side processor 22 via the interface unit 27. The camera-side processor 22 recognizes the type of the second external illuminator 5B based on the second signal returned from the illumination-side processor 52*b* of the second external illuminator 5B, and determines that the connected external illuminator is PoE incompatible based on the recognized type and the type information.

When the third external illuminator 5C is connected, the first signal is received by the illumination-side processor 53*b* of the third external illuminator 5C via the interface unit 27. Upon receiving the first signal, the illumination-side processor 53*b* sends a second signal including information related to a type of the third external illuminator 5C. The second signal is returned from the illumination-side processor 53*b* to the camera-side processor 22 via the interface unit 27. The camera-side processor 22 recognizes the type of the third external illuminator 5C based on the second signal returned from the illumination-side processor 53*b* of the third external illuminator 5C, and determines that the connected external illuminator is PoE compatible based on the recognized type and the type information.

When the camera-side processor 22 determines whether the external illuminator is PoE compatible or PoE incompatible, the camera-side processor 22 acquires the type information from the storage unit 29. Since the type information can be additionally stored by the software update, even if the external illuminator is of the new type, it is possible to determine whether the new type of external illuminator is the PoE-compatible or PoE-incompatible external illuminator as long as the software update is performed.

As described above, step SA8 ends. As a result of identifying the illuminator, when the connected external illuminator is PoE compatible, the processing proceeds to step SA9, and the camera-side processor 22 controls the power supply selector 26 to output the PoE voltage from the interface unit 27 to the external illuminator. On the other hand, when the connected external illuminator is PoE incompatible, the processing proceeds to step SA10, and the camera-side processor 22 controls the power supply selector 26 to output the voltage generated by the step-down circuit 25 from the interface unit 27 to the external illuminator.

In step SA11, the connected external illuminator is initialized. The external illuminator can be initialized by a signal from the camera-side processor 22. After initialization, the processing proceeds to step SA12. In step SA12, the camera-side processor 22 reads the PoE power range stored in the storage unit 29 based on the type information acquired in step SA8, and compares the read PoE power range with the user setting of the illumination volume set by the setting unit 28. The camera-side processor 22 determines whether the user setting is within the PoE power range. When the user setting is within the PoE power range, the processing proceeds to step SA13, and the user setting related to the illumination set by the setting unit 28 is reflected in the external illuminator.

That is, the camera-side processor 22 not only switches the voltage to be supplied, but also identifies whether the PoE voltage or the normal voltage is received in step SA3. When the camera-side processor 22 identifies that the normal voltage is received, the set illumination volume is reflected in the connected external illuminator. On the other hand, when the camera-side processor 22 identifies that the PoE voltage is received in step SA3, the camera-side processor 22 can determine whether light emission based on the set illumination volume is possible depending on whether the illumination volume set by the user is within the PoE power range of the connected external illuminator. When the camera-side processor 22 determines that the illumination volume set by the user is not within the PoE power range of the connected external illuminator, the processing proceeds to step SA14 in which the camera-side processor 22 outputs a signal for notifying an error indicating that the light emission based on the illumination volume set by the user is not possible.

When the camera-side processor 22 determines that the illumination volume set by the user is not within the PoE power range of the connected external illuminator, the camera-side processor 22 can automatically adjust the illumination volume to be within the PoE power range. At this time, an error may be notified simultaneously.

Although it is assumed that an external illuminator on which no processor is mounted is connected to the industrial camera 2, the camera-side processor 22 cannot acquire the type information, and thus it is not possible to determine whether the external illuminator is PoE compatible or PoE incompatible. In this case, for example, the industrial camera 2 supplies a predetermined low voltage lower than a normal voltage of, for example, about 1 V to the external illuminator, and gradually increases the supplied voltage over time. The camera-side processor 22 may acquire current-voltage characteristics of the light emitting body appearing by this way, and finally determine a voltage to be supplied based on the current-voltage characteristics of the light emitting body. For example, a supply voltage can be determined by the determination based on a voltage threshold when the light emitting body starts to emit light. As described above, the camera-side processor 22 may allow a predetermined current, as the first signal, to flow through the activated external illuminator via the interface unit 27, and identify whether the external illuminator is PoE compatible or PoE incompatible based on current-voltage characteristics of the external illuminator obtained from the predetermined current.

When the camera-side processor 22 cannot acquire the type information, the voltage to be supplied may be set by the user. The user can determine whether the connected external illuminator is the PoE-compatible or PoE-incompatible external illuminator. Based on the determination result, in a case of the PoE-compatible external illuminator, the user makes a setting so that the PoE voltage is supplied, and in a case of the PoE-incompatible external illuminator, the user makes a setting so that the step-down voltage is supplied. The camera-side processor 22 controls the power supply selector 26 according to the setting by the user.

Effects of Embodiment

As described above, according to the present embodiment, any one of the first external illuminator 5A, the second external illuminator 5B, and the third external illuminator 5C can be connected to the industrial camera 2 for use. One or both of the switching power supply 6A and the PoE power supply 6B can be connected to the industrial camera 2.

When the PoE-compatible external illuminator is connected to the interface unit 27 of the industrial camera 2, the PoE voltage supplied from the PoE power supply 6B having a higher voltage than the switching power supply 6A is supplied to the external illuminator via the power supply selector 26. On the other hand, when the PoE-incompatible external illuminator is connected to the interface unit 27, the voltage stepped down by the step-down circuit 25 is supplied to the external illuminator via the power supply selector 26, and thus it is possible to enable PoE power supply and realize a desired inspection without causing a failure even with the PoE-incompatible external illuminator.

The above-described embodiment is merely an example in every respect, and should not be construed as being limited. Furthermore, modifications and changes falling in the equivalent scope of the claims are all within the scope of the present invention.

INDUSTRIAL APPLICABILITY

As described above, the industrial camera according to the present disclosure can be used when generating a workpiece image for image inspection.

What is claimed is:

1. An industrial camera for image inspection, the industrial camera comprising:
   an imaging unit configured to generate a workpiece image obtained by imaging a workpiece;
   an interface unit configured to be connected to an external illuminator used during imaging by the imaging unit and to supply power to the external illuminator;
   a PoE power supply input unit to which a PoE voltage supplied from a PoE power supply having a higher voltage than a switching power supply is input;
   a first step-down circuit configured to step down the PoE voltage input to the POE power supply input unit;

a power supply selector configured to supply one of a voltage generated by the first step-down circuit and the PoE voltage to the external illuminator via the interface unit; and a first processor configured to control the imaging unit while transmitting a light emission instruction to the external illuminator, wherein the first processor is configured to identify whether the external illuminator is PoE compatible or PoE incompatible, and control the power supply selector to supply the PoE voltage to the external illuminator when the external illuminator is identified as PoE compatible, and to supply the voltage generated by the first step-down circuit to the external illuminator when the external illuminator is identified as PoE incompatible.

2. The industrial camera according to claim 1, wherein the power supply selector supplies the voltage generated by the first step-down circuit to the external illuminator to activate the external illuminator, and the first processor transmits, to the activated external illuminator, a first signal for identifying whether the external illuminator is PoE compatible or PoE incompatible via the interface unit.

3. The industrial camera according to claim 2, further comprising:

a storage unit configured to store type information including whether a type of the external illuminator is PoE compatible or PoE incompatible, wherein the first processor is configured to be communicably connected to a second processor included in the external illuminator via the interface unit, recognize the type of the external illuminator based on a second signal returned from the second processor via the interface unit in response to the first signal, and determine whether the external illuminator is PoE compatible or PoE incompatible based on the recognized type and the type information.

4. The industrial camera according to claim 3, wherein the storage unit is configured to additionally store other type information different from the type information already stored, and the first processor is configured to determine whether the external illuminator is PoE compatible or PoE incompatible based on the recognized type, the type information already stored, and the other type information.

5. The industrial camera according to claim 3, further comprising:

a normal power supply input unit to which a normal voltage from the switching power supply is input, and a setting unit configured to set an illumination volume of the external illuminator, wherein the type information stored in the storage unit includes a PoE power range that is settable when power is supplied by the PoE voltage for each type of the external illuminator, and the first processor is configured to identify which of the PoE voltage and the normal voltage is received, and when it is identified that the normal voltage is received, reflect the set illumination volume in the external illuminator, and when it is identified that the PoE voltage is received, determine whether light emission based on the set illumination volume is possible depending on whether the set illumination volume is within the PoE power range of the external illuminator.

6. The industrial camera according to claim 5, wherein the first processor is configured to output a signal for notifying a user of an error indicating that the light emission based on the set illumination volume is not possible when the set illumination volume is not within the PoE power range of the connected external illuminator.

7. The industrial camera according to claim 5, wherein the first processor is configured to automatically adjust the illumination volume to be within the PoE power range when the set illumination volume is not within the PoE power range of the connected external illuminator.

8. An industrial camera system including the industrial camera according to claim 1 and the external illuminator, wherein the external illuminator includes an illumination head and a conversion cable having a second processor configured to control light emission of the illumination head, the conversion cable includes a second step-down circuit configured to further step down a voltage supplied from the power supply selector, and the second processor is configured to supply a voltage generated by the second step-down circuit to the illumination head connected to the conversion cable and control the illumination head based on a light emission instruction transmitted from the first processor.

9. The industrial camera according to claim 2, wherein the first processor is configured to allow a predetermined current, as the first signal, to flow through the activated external illuminator via the interface unit, and identify whether the external illuminator is PoE compatible or PoE incompatible based on current-voltage characteristics of the external illuminator obtained from the current.

10. The industrial camera according to claim 5, wherein an upper limit value of the illumination volume is settable to a first value smaller than a maximum value settable within the PoE power range.

11. The industrial camera according to claim 10, wherein an update of software executable by the first processor is receivable, and the upper limit value of the illumination volume is settable, by the update of the software, to a second value that is equal to or smaller than the maximum value within the PoE power range and is larger than the first value.

* * * * *